United States Patent [19]

Searby et al.

[11] Patent Number: 4,580,007

[45] Date of Patent: Apr. 1, 1986

[54] STYLUS DEVICES RESPONSIVE TO PRESSURE CHANGES FOR USE IN VIDEOGRAPHIC AND LIKE APPARATUS

[75] Inventors: Anthony D. Searby; David W. Bowman, both of Newbury, England

[73] Assignee: Quantel Limited, Surrey, England

[21] Appl. No.: 579,740

[22] Filed: Feb. 13, 1984

[30] Foreign Application Priority Data

Oct. 14, 1983 [GB] United Kingdom ............... 8327536

[51] Int. Cl.[4] ............................................. G08C 21/00
[52] U.S. Cl. ................................................... 178/18
[58] Field of Search ........................... 178/18, 19, 20; 369/145; 340/706; 382/3, 58

[56] References Cited

U.S. PATENT DOCUMENTS 2,866,857 12/1958 Andrews ............................ 369/145
3,528,295 9/1970 Johnson et al. ..................... 178/18

Primary Examiner—Stafford D. Schreyer
Attorney, Agent, or Firm—Dowell & Dowell

[57] ABSTRACT

A stylus device for use in a videographic apparatus, includes a housing with a projecting stylus. In operation, pressure changes cause movement of the resiliently mounted stylus. This carries a magnet which co-operates with a Hall Effect transducer such that the pressure variation is converted into signal changes by the transducer. A moveable carrier allows the transducer to be moved to adjust the preload pressure in the stylus together with the preload out-put of the transducer.

6 Claims, 2 Drawing Figures

STYLUS DEVICES RESPONSIVE TO PRESSURE CHANGES FOR USE IN VIDEOGRAPHIC AND LIKE APPARATUS

BACKGROUND TO THE INVENTION

This invention relates to stylus devices for use in videographic and like apparatus.

A variety of forms of apparatus are available in which video signals are generated in response to movement of a stylus in contact with the surface of a touch tablet. Usually the stylus is mounted in a holder including a switch which is closed when contact occurs. A pick up coil is mounted near the tip of the stylus to pick up signals from the touch tablet which determine the position of the point of contact of the stylus on the tablet, and when the switch is closed these signals are transmitted to the videographic apparatus, where they are decoded and used to generate an elementary signal representing a picture point in a television type video waveform, the position of the elementary signal in said waveform corresponding to the point of contact. When the stylus is moved to 'draw' a line on the surface of the tablet, a train of elementary signals are produced in the video waveform so that, if the video waveform is reproduced in suitable manner, a corresponding line is displayed in the monitor screen.

It has been proposed in U.S. patent application Ser. No. 326,293 to provide the stylus device with a pressure sensitive transducer which produces a signal dependent on the pressure of the stylus on the touch tablet. The signal is fed to the videographic apparatus where it is used to control the magnitude of the elementary signals and thus the intensity of line displayed on the monitor screen.

Other pressure sensitive stylii are disclosed in U.S. Pat. Nos. 3,528,295 and 4,318,096.

In such arrangements the pressure sensitive element comprises a variable resistance which is flexed, compressed or is provided with a sliding contact in order to generate the signal variation dependent on pressure. Because of the generally mechanical nature of this action on the resistance element, the life expectancy and repeatability of operation can be rather limited in view of the substantial use to which the device is subjected.

OBJECT OF THE INVENTION

The object of the present invention is to provide an improved stylus device for producing an output signal responsive to pressure on the stylus, particularly with a view to achieving smoothness and consistency of operation.

SUMMARY OF THE INVENTION

According to the invention there is provided a stylus device comprising a housing, a projecting stylus slidably mounted in the housing, means for constraining the stylus so as to limit its movement outwards, a magnet within the housing, a Hall-effect transducer within the housing, and resilient means allowing relative movement between the magnet and the transducer in response to pressure changes on the stylus.

BRIEF DESCRIPTION OF THE DRAWINGS

In order that the invention may be clearly understood and readily carried into effect it will now be described with reference to the accompanying drawings in which.

DESCRIPTION OF THE PREFERRED EMBODIMENTS

Figure 1:
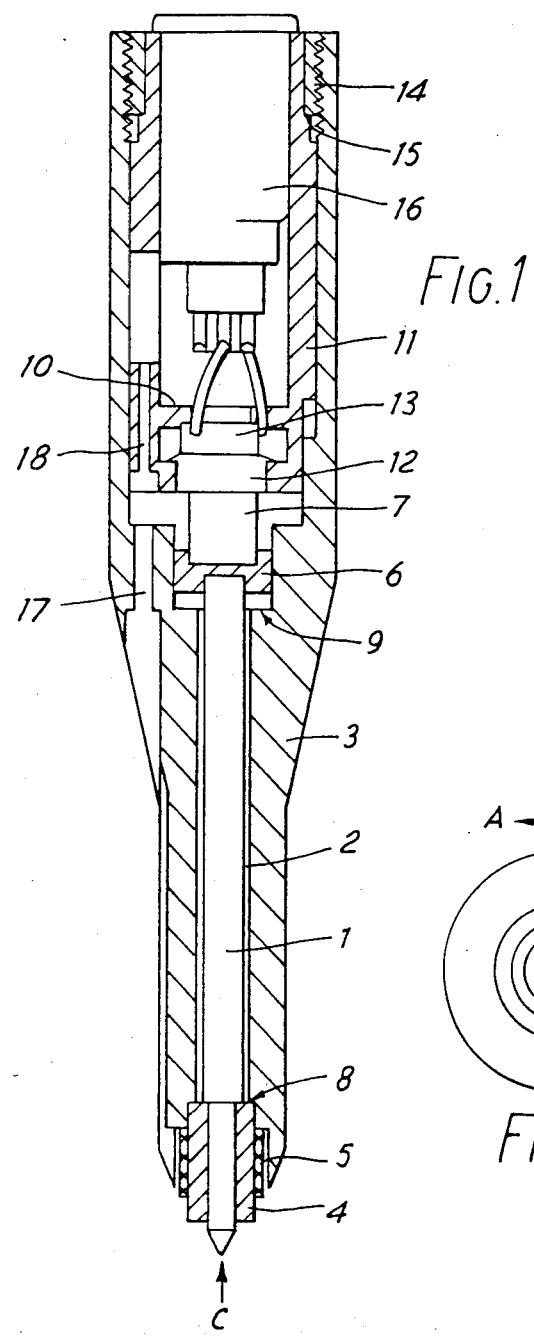
FIG. 1 illustrates one example of a stylus device according to the invention in longitudinal section taken on the line A-B in FIG. 2.
Figure 2:
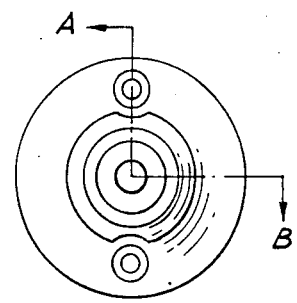
FIG. 2 is a view looking in the direction of the arrow C in FIG. 1.

Referring to the drawing, the stylus proper is indicated by the reference 1, and it is slidably mounted in the bore 2 of a housing 3. A ferrite bead 4 is attached to the stylus near its tip and a proximity coil 5, for picking up signals from the touch tablet, is wound on the ferrite bead. A magnet carrier 6 is attached to the inner end of the stylus and a permanent magnet 7 is secured to this carrier. A shoulder 8, adapted to be engaged by the ferrite bead, and a shoulder 9, adapted to be engaged by the magnet carrier 6, define the limits of movement of the stylus.

At the end of the housing 3 remote from the stylus tip, the bore is enlarged to receive a transducer carrier 11 which is slidable in the bore and at its inner end is attached to a resilient pad 12 at the top surface of the latter. The pad in turn has attached to it a Hall-effect transducer 13 which is retained by the shoulder 10 of carrier 11. The carrier 11 is held in position, with the resilient pad sandwiched between the transducer 13 and the magnet 7, by a pressure-adjusting ring 14 which is threaded into the interior of the housing 3 at the outer end thereof and presses against a shoulder 15 on the carrier 11 to cause the carrier to press the pad 12, carrying the transducer 13, against the magnet. The ring 14 has slots on its outer surface so that it can be adjusted by a suitable key. A socket 16 for a suitable electrical connector, whereby the stylus device can be connected to a videographic apparatus, is positioned at the outer end of the bore in the stylus holder, and the contacts within the socket are connected in a suitable manner to the windings in the transducer 12 for the provision of current thereto, and the derivation of an output voltage therefrom. Apertures 17 and 18 are provided in the housing 3 and the carrier 14 for receiving spring loaded contacts connected respectively to the proximity coil 5 and the contacts in the socket 16. There are two such pairs of apertures 17 and 18 but only one is visible in FIG. 1.

As is known the transducer will produce an output voltage which is proportional to the square of the applied magnetic field, and this is utilised to control the magnitude of the elementary video signals generated in the videographic apparatus to which the stylus device is connected. The magnetic field applied to the transducer 13 varies with the axial separation of the magnet 7 from the transducer 13 and this separation can be varied during 'drawing' at the choice of the person manipulating the stylus device, by varying the pressure with which the stylus is applied to the touch tablet, and thus compressing the resilient pad 12. In this way the intensity of the display produced by moving the stylus in contact with the touch tablet can be varied at choice, to give desired artistic or representational effects.

Moving the Hall-effect transducer 13 by means of the threaded ring 14 applies a pre-load pressure on the resilient pad 12 and provides a corresponding change of output sensitivity from the transducer for pressure applied to the stylus. The pad 12 in this example is made from rubber but any suitable resilient material may be used. The output of the Hall-effect transducer can, moreover, be employed if desired to vary some parameter other than the intensity in the display. For example it may be employed to vary hue or saturation in some desired way.

We claim:

1. A stylus device comprising:
    a housing;
    a projecting stylus slidably mounted in the housing;
    means for constraining the stylus so as to limit its movement outwards;
    a magnet within the housing;
    a Hall-effect transducer within the housing; and
    resilient means allowing relative movement between the magnet and the transducer in response to pressure changes on the stylus.

2. A device according to claim 1, wherein the magnet comprises a permanent magnet.

3. A device according to claim 1, including retaining means for holding the magnet at the inner end of the stylus.

4. A device according to claim 1, wherein the resilient means includes an elastomeric pad disposed between the magnet and the transducer.

5. A device according to claim 1, including a movable carrier for said transducer whereby the transducer can be initially moved relative to the magnet to vary the preload output of the transducer and the preload pressure on the stylus.

6. A device according to claim 5, wherein a threaded ring is provided in said housing to co-operate with the movable carrier to adjust the preload pressure.

* * * * *